GEORGE W. MORK,
INVENTOR.

BY John Adams Thierry

ATTORNEY

GEORGE W. MORK,
INVENTOR.

April 27, 1954  G. W. MORK  2,676,785
HYDRAULICALLY-CONTROLLED WINCH ASSEMBLY
Filed March 19, 1951  5 Sheets-Sheet 5

GEORGE W. MORK,
INVENTOR.

BY

ATTORNEY

Patented Apr. 27, 1954

2,676,785

UNITED STATES PATENT OFFICE 2,676,785

HYDRAULICALLY-CONTROLLED WINCH ASSEMBLY

George W. Mork, South Milwaukee, Wis., assignor to Bucyrus-Erie Company, South Milwaukee, Wis., a corporation of Delaware Application March 19, 1951, Serial No. 216,285

9 Claims. (Cl. 254—185)

This invention relates to new and useful improvements in hydraulically-controlled winches, more particularly to hydraulic winches intended to be attached to tractors and to be driven by the power take-off shaft of the tractor.

A principal object of the invention is to provide an improved hydraulically-controlled winch which is of simple compact design that can be attached to and detached from the tractor as a unit without assembly or disassembly of any of the hydraulic components such as the pump, the tank, the control cylinders, controls and piping.

A further object of the invention is to provide an improved hydraulically-controlled winch in which the controls and conduits leading thereto are rigidly mounted on a rigid part of the winch that also serves as a storage tank for hydraulic fluid and as a rigid support for the winch fairlead.

A further object of the invention is to provide an improved hydraulically-controlled winch in which the fluid conduits leading to the hydraulic controls are protected from damage and dirt by being enclosed in a rigid casing that also serves as a rigid support bracket for positioning the control valves and levers within easy access of the tractor operator.

A further object of the invention is to provide an improved hydraulically-controlled winch in which the control valves and piping leading thereto can be assembled and disassembled from the winch by simply connecting or disconnecting a supporting bracket.

In addition to the objects above stated, I have worked out a number of novel and useful details, which will be readily evident as the description progresses.

The invention consists in the novel parts and in the combination and arrangement thereof, which are defined in the appended claims, and of which three embodiments are exemplified in the accompanying drawings, which are hereinafter particularly described and explained.

Throughout the description the same reference number is applied to the same member or to similar members.

Figure 1:
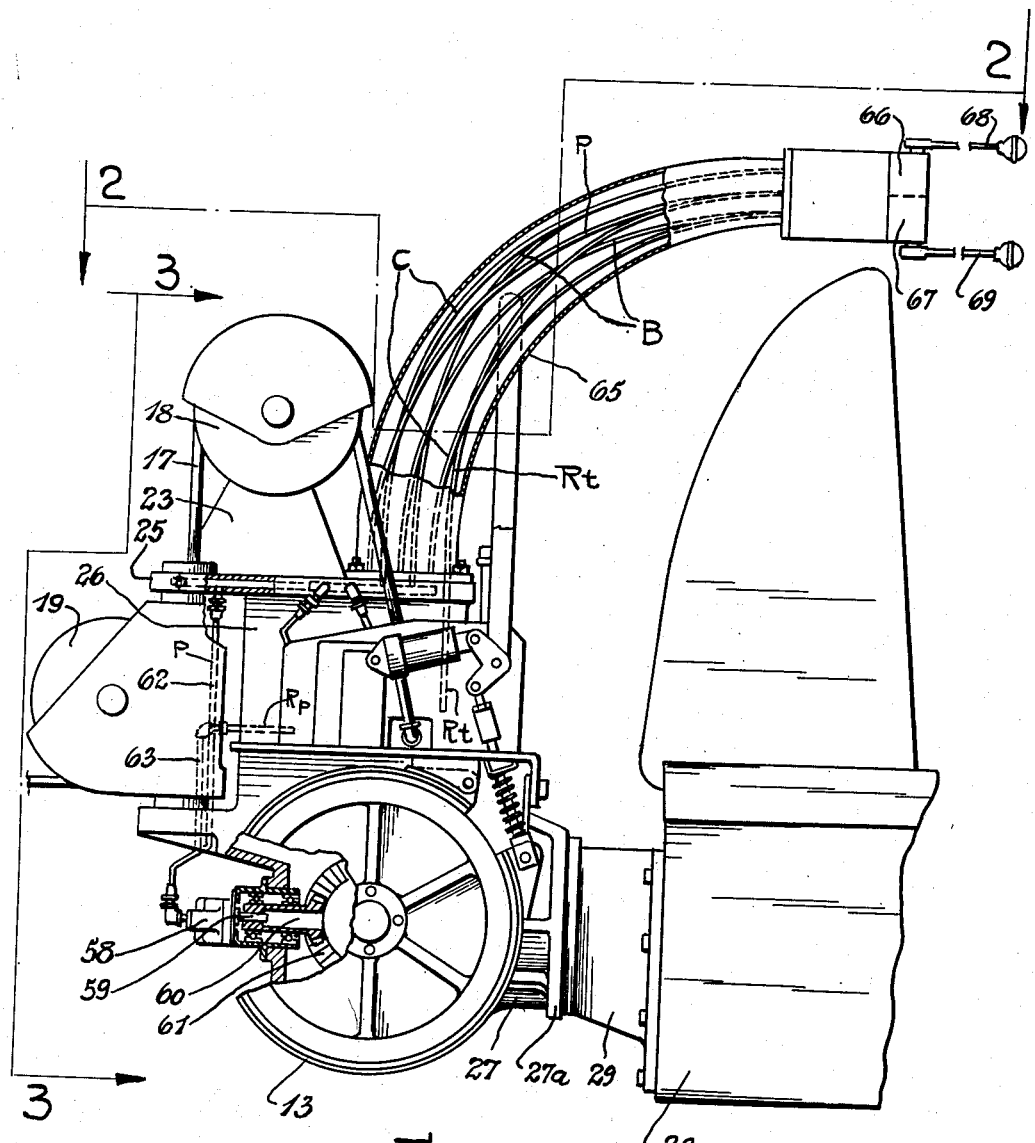
Figure 1 is a side elevation of the first embodiment of my winch.
Figure 2:
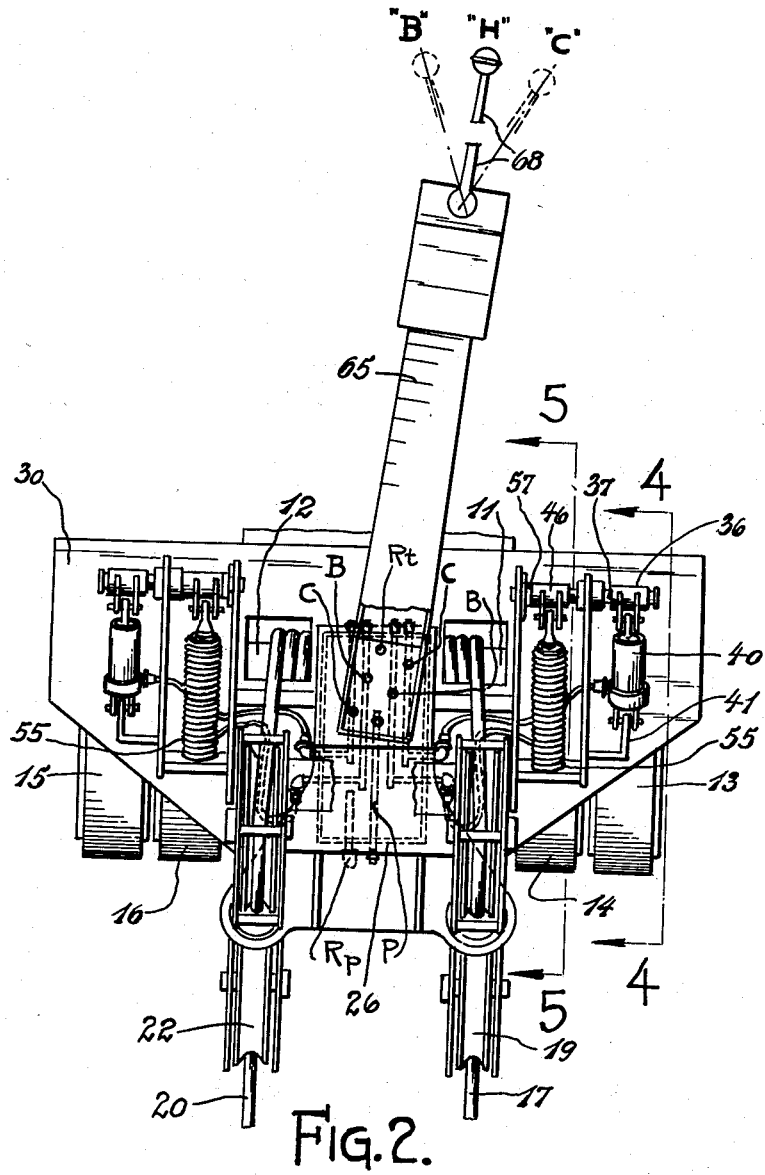
Figure 2 is a plan view of the winch, taken along the line 2—2 of Figure 1.
Figure 3:
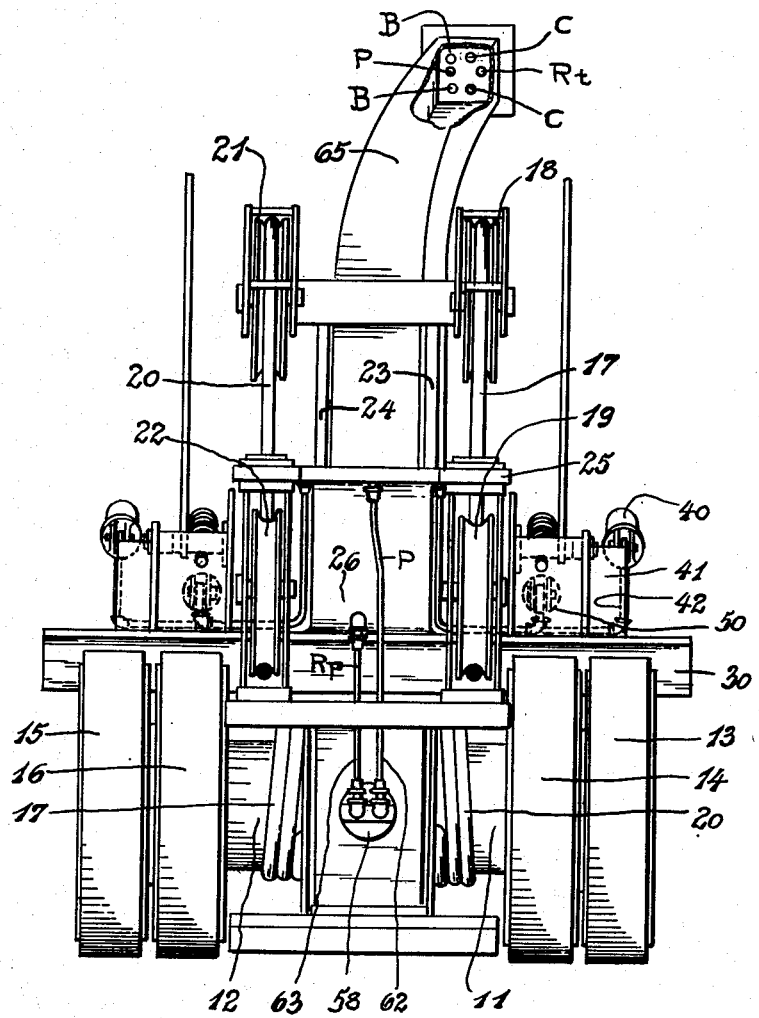
Figure 3 is a rear elevation of the winch, taken along the line 3—3 of Figure 1.

Turning now primarily to Figures 1-3, we see that the winch consists primarily of two drums 11, 12, each actuated by a conventional planetary system (not shown) in accordance with U. S. Patent No. 2,359,778, for a winch, issued to me October 10, 1944, which patent is hereby referred to and made a part of this specification. Drum 11 is controlled by clutch 13 and brake drum 14. Drum 12 is similarly controlled by clutch 15 and brake 16.

Rope 17 extends from drum 11, over fairlead sheave 18, under swivelled fairlead sheave 19, and thence to the work (not shown). Rope 20 similarly extends from drum 12, over fairlead sheave 21, under swivelled fairlead sheave 22, and thence to the work (not shown).

Fairlead sheaves 18 and 21 are mounted on two pedestals 23 and 24 which in turn are carried by upper deck plate 25 which also serves as the top cover plate of a tank 26 (hereinafter described).

The main gear case 27 has a circular flange 27a for rigid attachment to an adaptor 29 which in turn is secured to the supporting structure, such, for example, as the rear transmission case 28 of the tractor. The use of an adaptor enables one standard type of winch to be built and then to be fitted to any tractor.

Figure 4:
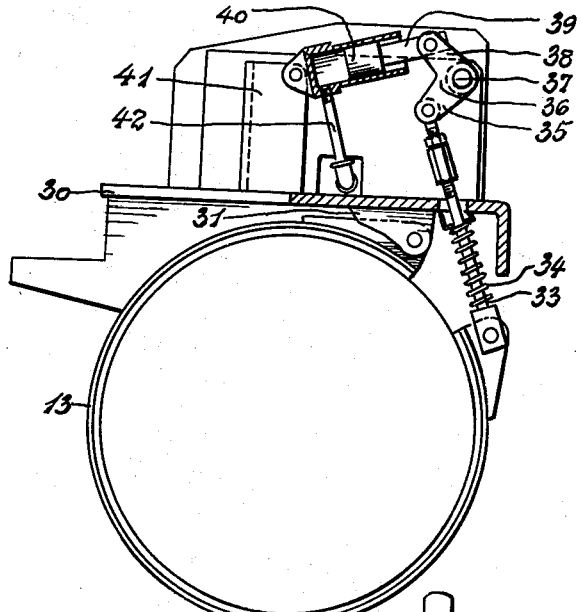
Figure 4 is a vertical section, taken along the line 4—4 of Figure 2, and illustrating the clutch band and control mechanism therefor (internal planetary gearing not shown).
Figure 5:
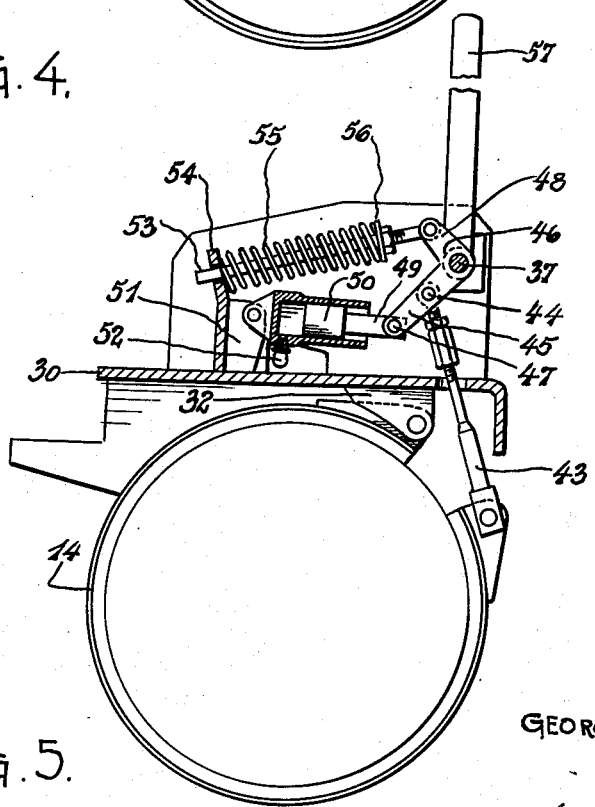
Figure 5 is a vertical section, taken along the line 5—5 of Figure 2, and illustrating the brake band and control mechanism therefor (internal planetary gearing not shown).

Each clutch and brake is actuated as will now be described as to the right-hand clutch and brake (Figures 4 and 5).

The dead end of clutch band 13 is pivoted on a lug 31 secured as by welding to the lower side of lower deck plate 30. Brake band 14 is similarly pivoted on lug 32.

The live end of clutch band 13 is pivoted on the lower end of a rod 33 which passes upwardly through a hole in the lower deck plate 30. Compression spring 34, bearing against the bottom of the lower deck plate and the head of rod 33, tends to force the clutch to unset. The upper end of rod 33 is pivoted on the lower arm 35 of a bellcrank 36 which is pivoted at its elbow on horizontal shaft 37 rigidly supported on the lower deck plate. The upper arm 38 of the bellcrank is pivotally connected to the end of rod 39 of single-acting cylinder-piston assembly 40, which is pivoted at its other end to upstanding support 41 on the lower deck plate 30. Pressure fluid, supplied to the cylinder-piston assembly through conduit 42, tends to force the clutch to set.

Similarly the live end of brake band 14 is pivoted on the lower end of a rod 43, which passes upwardly through a second hole in the lower deck plate 30 and is pivotally connected at its upper end to an intermediate point 44 on the lower arm 45 of a second bellcrank 46 which is likewise pivoted at its elbow on fixed horizontal shaft 37. The end of the lower bellcrank arm 45 is pivotally connected at 47 to the end of rod 49 of single-acting cylinder-piston assembly 50 which is pivoted at its other end to upstanding support 51 on the lower deck plate 30. Pressure fluid, supplied to this cylinder-piston assembly through conduit 52, tends to force the brake to unset. The upper arm 48 of bellcrank 46 is pivotally connected to another rod 53 which passes through a hole in fixed upstanding plate 54. Compression spring 55, bearing against plate 54 at one end and washer 56 at the other end of rod 53, tends to force the brake to set. Upstanding operating lever arm 57 rigidly connected to bellcrank 46 is used to unset the brake manually when pressure fluid is not available to actuate the cylinder-piston assembly 50, as, for example, when the tractor engine is shut off and it is desired to release a load that is held by the winch with the brake set.

Turning to Figures 1 and 3, it is seen that pressure fluid for the hydraulic system is supplied by a conventional pump 58 that is mounted on the gear case 27 of the winch, preferably, although not necessarily, at the rear thereof, and is driven, through shaft 59 and bevel pinion 60, by the main bevel gear 61 which is driven by the tractor power-take-off drive shaft (not shown) as is fully described in my above-mentioned Patent No. 2,359,778. Conduits 62 and 63 are respectively the pressure and return conduits from the pump. Pressure conduit 62 runs from the pump to the control valves as hereinafter described. Return conduit 63 runs from the pump to the upstanding fluid reservoir or tank 26.

Tank 26 is mounted on the top of the gear case and forms a square pedestal that forms an integral part of the fairlead pedestals 23 and 24 that support fairlead sheaves 18 and 21.

The winch assembly also includes an upstanding hollow bracket 65 which supports adjacent its upper end the control valves 66 and 67 for directing fluid under pressure to the brake and clutch cylinders for the two cable drums, and extends upwardly and forwardly to a point adjacent the driver's seat on the tractor, so that the operating handles 68 and 69 of the control valves are accessible to the driver. This hollow bracket 65 is supported by the gear case, being preferably mounted detachably on the top or other wall of the tank 26. The bracket 65 serves to fully enclose and protect the control valves 66 and 67 and the conduits leading to them which will now be described.

Each control valve is a conventional three-position transfer valve, the details of which form no part of this invention. One valve selectively directs pressure fluid to one or the other of the brake and clutch cylinders on the right-hand side of the winch, and the other valve performs the same function for the cylinders on the left-hand side of the winch.

Each valve operates as follows. When the valve operating handle is in hold position (H in Figure 2), the valve blocks passage of fluid to or from both the brake and clutch cylinders, so that in this valve position the brake is set and the clutch is unset. When the valve is in brake-releasing position (B in Figure 2), the valve admits pressure fluid to the brake cylinder, passage of pressure fluid to the clutch cylinder remaining blocked, so that in this valve position the brake is unset and the clutch is also unset. When the valve is in clutching position (C in Figure 2), the valve admits pressure fluid to the clutch cylinder, passage of pressure fluid to the brake cylinder being blocked, so that in this valve position the brake drags and the clutch is set.

Four conduits run to each valve from (1) brake cylinder, (2) clutch cylinder, (3) pump and (4) tank. Since the pump and tank conduits are common to both valves, it is seen that a total of six conduits run to the two valves from the base to the upper end of the bracket. These conduits have ports in the base of the bracket 65 that are arranged to register with a corresponding set of six ports in the upper face of the upper deck plate 25 which forms the top of the tank. This makes it possible to detach the bracket and control valves from the winch assembly by merely unbolting the bracket 65 without disconnecting any conduits. Internal bored conduits in the upper deck plate 25 run between the ports in the upper face of the upper deck plate and external conduits that run to the cylinders, the pump, and the bottom of the tank. The arrangement of conduits and ports in the bracket 65 and upper deck plate 25 is shown in Figures 1 to 3, in which the function of each conduit is indicated as follows:

P—supplies pressure fluid from pump.
$R_t$—returns fluid to tank.
$R_p$—returns fluid to pump.
B—supplies and returns pressure fluid to and from brake.
C—supplies and returns pressure fluid to and from clutch.

The following important advantages accrue from the above-described method of mounting the controls and other elements of my winch assembly:

(1) The entire winch assembly, including all of its hydraulic equipment and controls, can be attached to and detached from the tractor as a unit by merely unbolting the stem of the gear case 27 from the tractor.

(2) The tank structure serves the additional triple function of fairlead pedestal, base for control valve bracket, and panel for fluid conduits, thus providing a more sturdy, simple and compact design.

(3) The hydraulic control levers are placed within easy reach of the operator on the tractor without exposed piping and without attaching any piping or other accessories to the tractor.

(4) The hydraulic controls can be readily detached from the winch unit by simply unbolting bracket 65 from the top of the tank, without disconnecting any piping.

Figure 6:
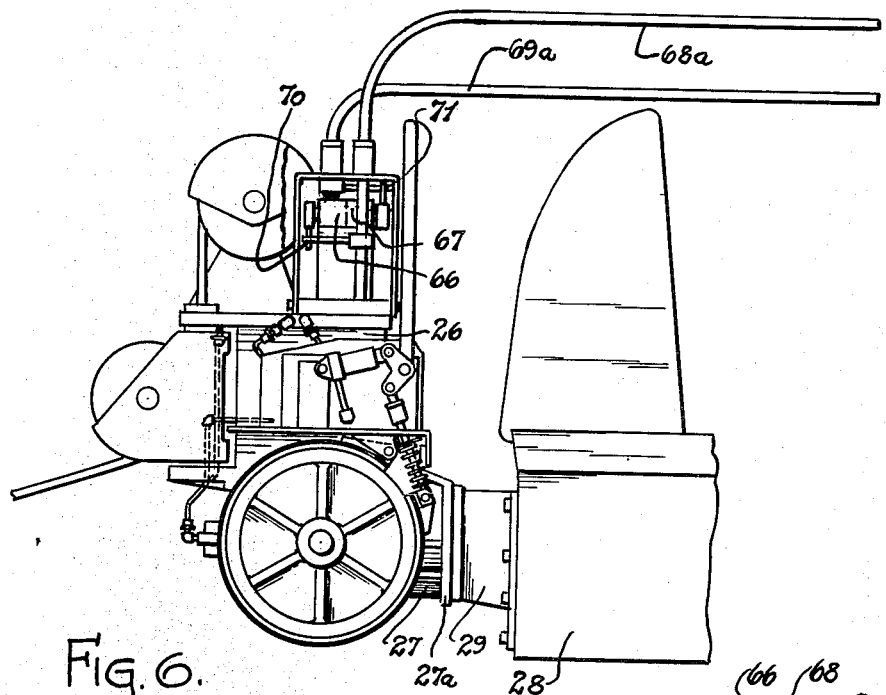
Figure 6 is a side elevation, similar to Figure 1, but showing a second embodiment of my winch.

Turning now to Figure 6, this represents a second embodiment of my invention in which the control valves 66 and 67 are mounted directly on the top of tank 26, instead of at the end of a bracket, and are operated by long operating handles 68a and 69a which extend upwardly and forwardly from the valves to a point adjacent the driver's seat on the tractor. Each operating handle is connected to its valve through a suitable lever mechanism (70, 71 respectively) in order to reduce the length of the arc through which the operator's hand must move in operating each handle between the three above-described valve positions. This arrangement makes it possible to use the winch unit on different types of tractor, in which the operator's seat is located farther from or nearer to the winch, by merely using longer or shorter handles, as the case may be. This embodiment, like the first, satisfies the basic requirement of a winch unit which is connected to the tractor only through the adaptor 29 and can, therefore, be assembled to and disassembled from the tractor with minimum effort and without the necessity of special attachments on the tractor for mounting valves, piping, and other winch parts.

Figure 7:
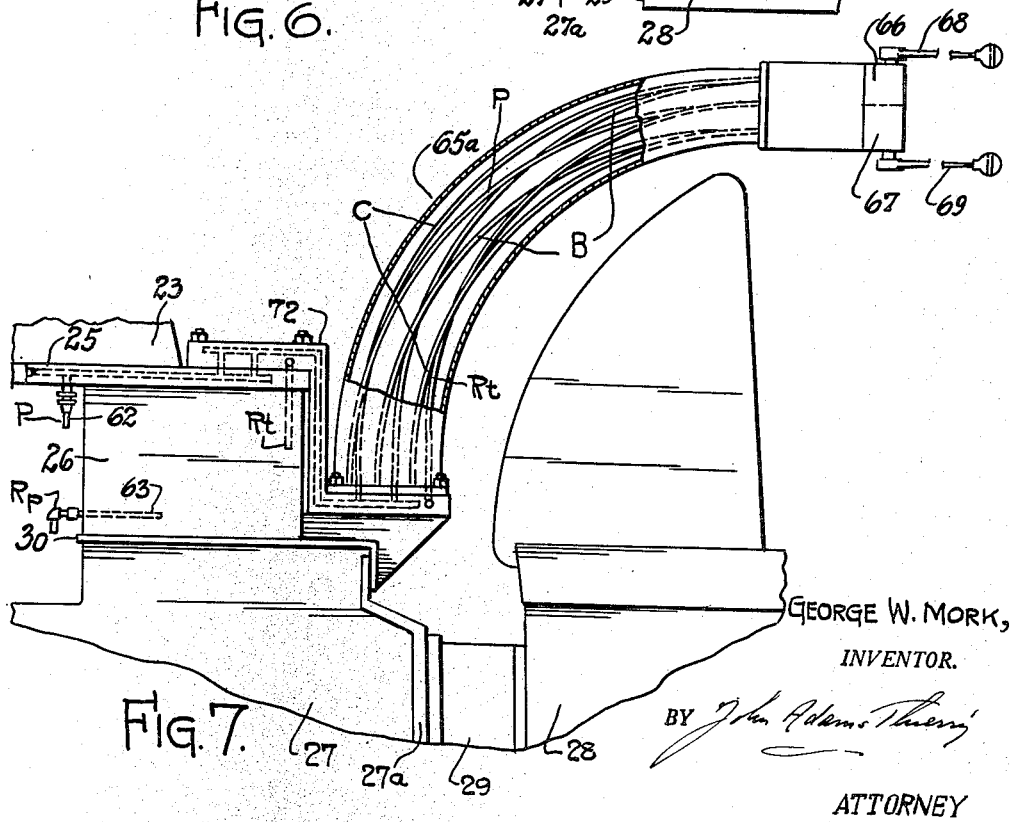
Figure 7 is a side elevation, similar to Figure 1, but partly in section and showing a portion of a third embodiment of my winch.

Turning now to Figure 7, this represents a third embodiment of my invention in which the hollow valve mounting bracket 65a is mounted on the side of the tank instead of the top of the tank, this being a more convenient arrangement with certain types of tractor. The bracket 65a fully encloses conduits running between valves 66 and 67 at the end of the bracket and ports in the base of the bracket, in the same manner as in my first embodiment. These ports register with a set of corresponding ports in the side of an adapter 72, which is mounted on the side of the tank, and to which the bracket is detachably connected. Adapter 72 contains internal bored conduits that connect with the conduits in upper deck plate 25 and lead to the pump, tank, and hydraulic cylinders, as in the first embodiment.

Although I describe my winch as having two drums and two sets of cylinders and valves for independent control of such drums, my invention is equally applicable to a single drum winch and its control valve, or to a winch with more than two drums and controls, and claims which mention one drum, and one valve therefor are intended to apply to any drum and associated control of a multiple drum winch as well as to a single drum winch.

Having now described and illustrated one form of my invention, I wish it to be understood that my invention is not to be limited to the specific form or arrangement of parts herein described and shown.

I claim:

1. A tank assembly for an hydraulic winch which includes a gear casing having a stem adapted to be detachably mounted on a tractor, a drive shaft in the stem, a cable drum rotatably supported by the gear casing and driven by the drive shaft, a brake and a clutch for the cable drum, an hydraulic cylinder for engaging the clutch, an hydraulic cylinder for releasing the brake, a control valve for directing fluid under pressure selectively to one or the other of said cylinders, a pump mounted on the gear casing and driven by the drive shaft, a fairlead for the cable drum, and a pedestal for the fairlead mounted on the gear casing; such tank assembly consisting of: an upstanding tank mounted on the gear case and incorporated as an integral part of the fairlead pedestal, a deck plate forming the top of said tank, an upstanding hollow bracket detachably mounted upon said deck plate, said bracket supporting said control valve adjacent its upper end and extending to a point adjacent the driver's seat on the tractor, fluid conduits enclosed within said bracket and leading from said control valve to outlets on the underside of the base of said bracket, bored fluid conduits in said deck plate having ports for connection to fluid conduits leading to the pump and cylinders and having ports in the upper face of said deck plate arranged to register with the first-mentioned ports of the bracket when the bracket is attached to said deck plate.

2. A tank assembly for an hydraulic winch which includes a cable drum adapted to be detachably mounted on a tractor, a brake and a clutch for the cable drum, a fairlead for the cable drum, a pedestal for the fairlead, an hydraulic cylinder for releasing the brake, an hydraulic cylinder for engaging the clutch, a control valve for directing fluid under pressure selectively to said cylinders; such tank assembly consisting of: an upstanding fluid tank incorporated as an integral part of the fairlead pedestal, and an upstanding hollow bracket detachably mounted upon said tank, said bracket supporting said control valve adjacent its upper end and extending to a point adjacent the driver's seat on the tractor.

3. A tank assembly according to claim 2 further characterized by having a deck plate that forms the top of the tank, by having fluid conduits bored in said deck plate and ports for said conduits in the top face of said deck plate, and by having fluid conduits enclosed within the hollow bracket, said last-mentioned conduits running from the control valve to ports at the base of the bracket, the ports at the top of the plate and the ports at the base of the bracket being arranged to register with each other when the bracket is attached to the deck plate.

4. A tank assembly according to claim 2 further characterized by having a set of fluid ports in the base of said bracket, and a set of fluid conduits fully enclosed within said bracket and running from said control valve to said fluid ports.

5. A tank assembly according to claim 4, further characterized by having a set of ports in the outside face of a wall of the tank under the base of the bracket; and a set of fluid conduits running from said ports to said cylinders, a source of fluid pressure, and the interior of the tank; said last-mentioned ports being arranged to register with the ports in the base of the bracket when the bracket is attached to the tank.

6. A tank assembly for an hydraulic winch which includes a gear casing adapted to be detachably mounted on a tractor, a cable drum rotatably supported by the gear casing, a brake and a clutch for the cable drum, an hydraulic cylinder for engaging the clutch, an hydraulic cylinder for releasing the brake, and a control valve for directing fluid under pressure to said cylinders; such tank assembly consisting of an upstanding fluid tank mounted on the gear case; an upstanding hollow bracket detachably mounted upon said tank, said bracket supporting said control valve adjacent its upper end and extending to a point adjacent the driver's seat on the tractor; and a set of fluid conduits enclosed within said hollow bracket and leading from said control valve to ports at the lower end of the bracket, one of said conduits being a direct return conduit from said valve to said tank.

7. In an hydraulic winch, the combination of: a gear casing having a stem adapted to be detachably mounted on a tractor; a drive shaft in the stem; a cable drum rotatably supported by the gear casing and operatively connected to the drive shaft to be driven thereby; a fairlead for the cable drum; a pedestal for the fairlead mounted on the gear case; a brake and a clutch for the cable drum; an hydraulic cylinder for engaging the clutch; an hydraulic cylinder for releasing the brake; a control valve for directing fluid under pressure to said cylinders; a pump mounted on the gear casing and operatively connected to the drive shaft to be driven thereby; a fluid tank supported by the gear casing and incorporated as an integral part of the fairlead pedestal; and an upstanding hollow bracket supported by the gear casing, said bracket supporting said control valve adjacent its upper end and extending to a point adjacent the driver's seat on the tractor.

8. A unitary hydraulic winch assembly, comprising: a gear casing having a stem adapted to be detachably mounted on a tractor; a drive shaft in the stem; a cable drum rotatably supported by the gear casing and driven by the drive shaft; a brake and a clutch for the cable drum; an hydraulic cylinder for engaging the clutch; an hydraulic cylinder for releasing the brake; a pump mounted on the gear casing and driven by the drive shaft; a tank assembly mounted on the gear case and including: a tank proper, a control valve for directing fluid under pressure selectively to one or the other of said cylinders, and an upstanding hollow bracket detachably mounted upon said tank, said bracket extending to a point adjacent the driver's seat on the tractor and supporting said control valve at the outer end of said bracket, and fluid conduits enclosed within said bracket and leading from said control valve to ports on the underside of the base of said bracket, the entire aforesaid winch assembly being detachable as a unit from the tractor by detachment of said stem from the tractor.

9. A unitary hydraulic winch assembly according to claim 8, further characterized by having a deck plate that forms the top of the tank, by having fluid conduits bored in said deck plate and ports for said conduits in the top face of said deck plate, the ports at the top of the deck plate and the ports at the base of the bracket being arranged to register with each other when the bracket is attached to the deck plate.

References Cited in the file of this patent

UNITED STATES PATENTS

| Number | Name | Date |
|---|---|---|
| 2,178,280 | Hutchins et al. | Oct. 31, 1939 |
| 2,312,552 | Hutchins | Mar. 2, 1943 |
| 2,321,905 | French | June 15, 1943 |
| 2,337,772 | Robinson | Dec. 28, 1943 |
| 2,378,225 | Lear et al. | June 12, 1945 |
| 2,502,898 | Spitzer | Apr. 4, 1950 |
| 2,537,267 | Gurries et al. | Jan 9, 1951 |